United States Patent Office 3,479,370
Patented Nov. 18, 1969

3,479,370
ESTERS OF 1-SUBSTITUTED-3-DISUBSTITUTED-PYRROLIDINEMETHANOLS
Carl D. Lunsford, Grover C. Helsley, and John A. Richman, Jr., Richmond, Va., assignors to A. H. Robins Company, Incorporated, Richmond, Va., a corporation of Virginia
No Drawing. Filed Aug. 8, 1966, Ser. No. 570,722
Int. Cl. C07d 27/04; A61k 27/00
U.S. Cl. 260—326.3                               18 Claims

ABSTRACT OF THE DISCLOSURE

Lower alkyl esters of 1-substituted-$\alpha,\alpha$-disubstituted-3-pyrollidinemethanols having pharmacological activity as analgetics are described.

---

The present invention relates to certain novel esters of substituted pyrrolidinemethanols and is more particularly concerned with the lower alkyl esters of 1-substituted-$\alpha,\alpha$-disubstituted-3-pyrrolidinemethanols, acid addition salts thereof, therapeutic compositions containing the same as active ingredients, and method of making and using them.

The invention is especially concerned with novel lower alkyl esters of 1-substituted-$\alpha,\alpha$-disubstituted-3-pyrrolidinemethanols having the formula:

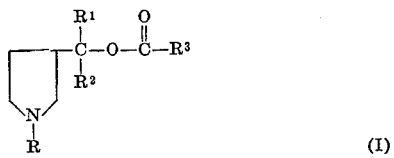

wherein R is lower alkyl, phenyllower-alkyl, substituted phenyllower-alkyl, cycloalkyl, phenoxylower-alkyl, phenylaminolower-alkyl, phenyl and substituted phenyl,
wherein $R^1$ is hydrogen, lower alkyl, phenyl, phenyl-lower alkyl, cycloalkyl and substituted phenyl,
wherein $R^2$ is phenyl and substituted phenyl,
wherein $R^3$ is lower alkyl,
and the pharmaceutically acceptable nontoxic acid addition salts thereof.

Prior art literature (U.S. Patent Numbers 2,833,775; 3,052,685; 3,068,237; 3,081,303; 3,153,946) discloses 1-substituted-$\alpha,\alpha$-disubstituted-2,3 and 4-piperidinemethanols. Van Campen et al. U.S. Patent 2,874,161 shows 1-substituted-$\alpha,\alpha$-disubstituted - 2 - piperidineethanols. Feldkamp et al. U.S. Patent 3,006,925 discloses 1-alkyl-$\alpha,\alpha$-disubstituted-3-pyrrolidineethanols useful for muscular tremors and convulsion disorders. Various pharmacodynamic acivity has been claimed for the aforementioned piperidinemethanols and piperidineethanols. It has been found on the other hand, that the alcohol precursors of the novel esters of the present invention do not possess analgetic acivity, and in fact have not been found to have any pharmacological activity, and that the analgetic activity resides in the novel lower alkyl esters of the 1-substituted-$\alpha,\alpha$-disubstituted - 3 - pyrrolidinemethanols of the present invention.

The 1-substituted-$\alpha,\alpha$-disubstituted - 3 - pyrrolidinemethanol precursors will not possessing any demonstrable pharmacological activity are valuable as intermediates for the novel esters of the present invention and as intermediates for a series of pharmacologically active compounds disclosed in copending application entitled 3-Disubstituted Methylene Pyrrolidines.

The compounds of Formula I are primarily useful as analgetics. They were tested for analgetic activity by the method of Randall and Selitto, Arch. Inc. Pharmacodyn. 113, 233 (1957). When, for example, the propionate ester of 1-ethyl-$\alpha$-ethyl-$\alpha$-phenyl - 3 - pyrrolidinemethanol was tested, 100 percent of all animals tested exhibited analgesia at a dose level of 30 mg./kg. I.P. There were no observable side effects.

It is accordingly an object of the present invention to provide novel lower alkyl esters of 1-substituted-$\alpha,\alpha$-disubstituted-3-pyrrolidinemethanols useful for their analgetic activity. Another object is to provide novel compounds which when admiinstered to living animal bodies provide analgesia with minimum side effects. A still further object of the present invention is to provide methods for producing the novel lower alkyl esters of 1-substituted-$\alpha,\alpha$-disubstituted-3-pyrrolidinemethanols and methods for the utilization thereof. Additional objects will become apparent hereinafter and still others will be apparent to one skilled in the art.

In the definition of the symbols in the formulas hereof and where they appear elsewhere throughout this specification, the terms have the following significance.

A "substituted phenyl" radical is a phenyl radical substituted by any radical or radicals which are not reactive or otherwise interfering under the conditions of reaction, such radicals including lower alkoxy, lower alkyl, di-lower-alkylamino, trifluoromethyl, halo, and the like. The substituted phenyl radicals have preferably no more than one to three substituents such as those given above and, furthermore these substituents can be in various available positions of the phenyl nucleus and, when more than one substituent is present, can be the same or different and can be in various position combinations relative to each other. The lower alkoxy, lower alkyl and di-lower-alkylamino substituents each have preferably from one to four carbon atoms which can be arranged as straight or branched chains. A total of nine carbon atoms in all ring substituents, making a total of fifteen carbon atoms in the radical, is the preferred maximum.

The term "lower alkyl" as used herein includes straight and branched chain radicals of up to eight carbon atoms inclusive, preferably no more than six carbon atoms, and is exemplified by such groups as methyl, ethyl, propyl, isopropyl, butyl, sec. butyl, tertiary butyl, amyl, isoamyl, hexyl, heptyl, octyl and the like. A "lower-alkoxy" group has the formula -0-lower-alkyl.

The term "cycloalkyl" as used herein includes primarily cyclic radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl.

Included in the term "phenylalkyl" are lower-alkyl substituted monocarbocyclic aryl groups such as benzyl, phenethyl, methylbenzyl, phenpropyl and the like. "Substituted phenylalkyl" groups may contain all of the substituents and variations thereof already disclosed for a "substituted phenyl" radical. When halogen is referred to herein, preferably but not necessarily a halogen of atomic weight not greater than eighty is employed. A "phenoxy-lower-alkyl" radical has the formula phenyl-0-lower-alkyl. A "phenylamino alkyl" has the formula phenyl-NH-lower-alkyl.

At least two asymmetric centers are present in many of the compounds which may be used in the present invention at the 3-position of the pyrrolidine ring and at the $\alpha$-carbon atom. At least one pair of diastereoisomers therefore exists for each compound. Use of these diastereoisomers, or their optically active forms, is included within the scope of the present invention. The optically active forms of the diastereoisomers may be obtained by combining the basic racemic form with an optically active organic acid and separating by fractional crystallization the d- and l- forms.

This invention also includes acid addition salts of the above defined bases formed with nontoxic organic and inorganic acids. Such salts are easily prepared by methods known in the art. When the compounds are to be used as intermediates for preparing other compounds or for any other non-pharmaceutical use, the toxicity or non-toxicity of the salt is immaterial; when the compounds are to be used as pharmaceuticals, they are most conveniently used in the form of nontoxic acid-addition salts. Both toxic and nontoxic salts are therefore within the purview of the invention. The acids which can be used to prepare the preferred nontoxic acid-addition salts are those which produce, when combined with the free bases, salts whose anions are relatively innocuous to the animal organism in therapeutic doses of the salts, so that beneficial physiological properties inherent in the free bases are not vitiated by side-effects ascribable to the anions.

The base is reacted with the calculated amount of organic or inorganic acid in aqueous miscible solvent, such as ethanol or isopropanol, with isolation of the salt by concentration and cooling, or the base is reacted with an excess of the acid in aqueous immiscible solvent, such as ethyl ether or isopropyl ether, with the desired salt separating directly. Exemplary of such organic salts are those formed with maleic, fumaric, benzoic, ascorbic, pamoic, succinic, methanesulfonic, acetic, propionic, tartaric, citric, lactic, malic, citraconic, itaconic, hexamic, p-aminobenzoic, glutamic, stearic acid and the like. Exemplary of such inorganic salts are those formed with hydrochloric, hydrobromic, sulfuric, sulfamic, phosphoric and nitric acids.

The starting materials for the novel compounds of the present invention are 1-substituted-3-cyanopyrrolidines and 1-substituted-2-pyrrolidinones. The preparation of the 1-substituted-3-cyanopyrrolidines has been disclosed in copending application Serial No. 493,887, filed October 7, 1965. The 1-substituted-2-pyrrolidinones are prepared by procedures well known in the art.

The compounds of the present invention are prepared by the following series of steps:

(1) A 1-substituted-3-cyanopyrrolidine of the formula

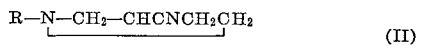
(II)

wherein R is as represented above, is reacted with an excess of a phenylmagnesium halide or a substituted phenylmagnesium halide of the formula $$R^2MgX$$

wherein $R^2$ is a phenyl radical or a substituted phenyl radical to give a 1-substituted-3-benzoylpyrrolidine or a 1-substituted-3-substituted benzoylpyrrolidine of the formula

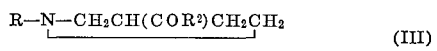
(III)

(2) The 1-substituted-3-benzoylpyrrolidine or the 1-substituted-3-substituted benzoylpyrrolidine of the formula

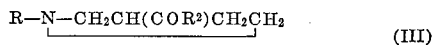
(III)

wherein R and $R^2$ are as represented above is reacted (a) with an excess of a lower-alkyl-, phenyl-, phenylalkyl-, substituted phenyl alkyl- or a cycloalkyl magnesium halide of the formula $$R^1MgX$$

or is (b) reduced by metal hydride reduction to give a 1 - substituted-$\alpha,\alpha$-disubstituted-3-pyrrolidinemethanol of the formula

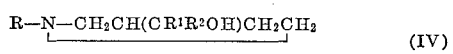
(IV)

wherein R, $R^1$ and $R^2$ have the values given above.

(3) The 1-substituted $\alpha,\alpha$-disubstituted-3-pyrrolidinemethanol (IV) is reacted with a lower aliphatic acid anhydride of the formula

$$(R^3CO)_2O$$

to give the novel lower alkyl esters of the present invention of the formula

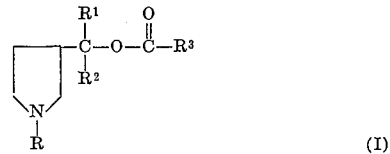
(I)

wherein R, $R^1$, $R^2$ and $R^3$ have the values given above.

As an alternate procedure for preparing the novel compounds of the present invention a 1-substituted-2-pyrrolidinone of the formula

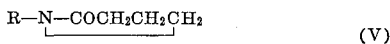
(V)

wherein R is as represented above, is reacted with a ketone of the formula $$R^1COR^2$$

wherein $R^1$ and $R^2$ are as represented above in liquid ammonia in the presence of an alkali amide condensing agent to give a 1-substituted-2-oxo-$\alpha,\alpha$-disubstituted-3-pyrrolidinemethanol of the formula

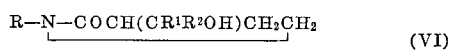
(VI)

The 1 - substituted-2-oxo-$\alpha,\alpha$-disubstituted-3-pyrrolidinemethanol (VI) is reduced by metal hydride reduction to give a 1-substituted-$\alpha,\alpha$-disubstituted-3-pyrrolidinemethanol of the formula

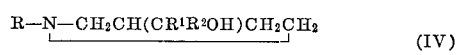
(IV)

Esterification of the 3-pyrrolidinemethanols (IV) by step (3) above gives the novel lower alkyl esters of the present invention of formula (I).

In the procedures involving the use of the Grignard reaction, the reactants are brought together in a suitable medium such as ether, benzene, toluene or dimethoxyethane, ether being the preferred reaction medium. The reactions are carried out for a period from about one hour to about eight hours and at a temperature from about room temperature to the reflux temperature of the solvent used. Six hours appears to be the optimum reaction time when the reactions are carried out at refluxing temperatures. The cooled reaction mixtures are decomposed using aqueous ammonium chloride solution, the organic and aqueous layers separated and non-basic materials separated from the organic layers by acid-base extraction. The products are isolated by distillation at oil pump vacuum of the residual oil remaining after removal of the solvent.

Reduction of ketone groups as in the reduction of 3-benzoyl-1-ethylpyrrolidine or of amide groups as in the reduction of 1-(2-phenylethyl)-2-oxo-$\alpha,\alpha$-diphenyl-3-pyrrolidinemethanol is achieved by metal hydride reduction in a norganic solvent including, for example, ether, tetrahydrofuran, benzene, toluene, ethylene glycol, dimethyl ether, methanol, isopropanol, and the like. Metal hydrides generally used include lithium aluminum hydride, sodium borohydride, potassium borohydride, sodium borohydride-aluminum chloride, diisobutylaluminum hydride and the like. The compound to be reduced is dissolved in or suspended in a solvent and the solution or suspension added dropwise to a stirred suspension of the metal hydride in a solvent. After stirring and refluxing for about 2 to 5 hours, the reaction mixture is worked up and the product separated by procedures well known in the art.

In the alternate procedure the reaction between a 1-substituted-2-pyrrolidinone and a ketone which can be a dialkyl ketone such as 2-butanone, an alkyl aryl ketone such as acetophenone, or a diaryl ketone such as benzophenone is carried out in liquid ammonia using an equivalent amount of an alkali amide as a metalating agent. Sodium amide, lithium amide and potassium amide prepared in situ can equally be used. After metalation of the pyrrolidinone a solution of the ketone in a suitable organic solvent such as ether, benzene, toluene, tetrahydrofuran and the like is added. After stirring for a period of about 1 to 3 hours, solid ammonium chloride is added to decompose the reaction complex with a suitable amount of solvent being added to replace the evaporated ammonia. The solvent is evaporated and the residue purified by crystallization if a solid or by distillation at oil pump vacuum if the product is an oil.

The novel lower alkyl esters of the 1-substituted-α,α-disubstituted-3-pyrrolidinemethanols are prepared from the precursor alcohols by reaction with a lower aliphatic acid anhydride in a solvent which provides a medium for but does not enter into the reaction. Solvents which can be used within the purview of this invention include benzene, toluene, xylene and the like, benzene being the preferred solvent. Examples of lower aliphatic acid anhydrides include acetic anhydride, propionic anhydride, butyric anhydride and the like. The reactants are brought together in a suitable solvent as, for example, benzene, a catalytic amount of 2° pyridine added and the stirred reaction mixture refluxed for about five to twenty hours. The cooled reaction mixture is washed with 10% aqueous sodium bicarbonate and water. The ester residue remaining after evaporation of the solvent is purified by distillaiton at oil pump vacuum or by crystallization of its acid addition salt from a suitable solvent.

PREPARATION OF INTERMEDIATES

Preparation I: 3-benzoyl-1-ethylpyrrolidine

An ethereal solution of phenylmagnesium bromide was prepared using 61 g. (2.5 moles) of magnesium, 410 g. (2.6 moles) of bromobenzene and 650 ml. of dry ether. The stirred ethereal solution was treated with 248 g. (2.0 moles) of 3-cyano-1-ethylpyrrolidine dissolved in an equal volume of dry ether and following addition the mixture was refluxed six hours. The reaction mixture was decomposed by the careful addition of a solution of 250 g. of ammonium chloride in 750 ml. of water. Following evaporation of the ether, the solution was heated on the steam bath to complete hydrolysis of the ketimine. The product was extracted with ether and then separated from non-basic materials by acid-base extraction. The residual oil was distilled at 97–99° C./.05 mm. to give 180 g. (44%) of 3-benzoyl-1-ethylpyrrolidine.

Preparation II: 3-benzoyl-1-methylpyrrolidine

To a stirred ether solution of phenylmagnesium bromide prepared from 37.5 g. (1.55 moles) of magnesium, 251 g. (1.60 moles) of bromobenzene and 425 ml. of dry ether was added dropwise a solution of 140 g. (1.27 moles) of 3-cyano-1-methylpyrrolidine in 200 ml. of dry ether. After refluxing two hours, the cooled reaction mixture was treated with a solution of 80 g. of ammonium chloride in 260 ml. of water. The ether was evaporated, the aqueous solution heated one hour to complete hydrolysis of the ketimine and the ketone product extracted with ether. Non-basic materials were separated by acid-base extraction. The residual oil after removal of the ether solvent was distilled in vacuo to give 102 g. (41%) of product at 93–95° C./.05 mm. Analysis: Calculated for $C_{12}H_{15}NO$: N, 7.40. Found: N, 7.57.

Preparation III: 1-benzyl-3-benzoylpyrrolidine 1-benzyl-3-cyanopyrrolidine (279 g.; 1.5 moles) in 300 ml. of dry ether was added dropwise to stirred ether solution of phenylmagnesium bromide prepared from 73.0 g. (3.0 moles) of magnesium, 502 g. (3.2 moles) of bromobenzene in 550 ml. of dry ether. After a six hour reflux period the cooled reaction mixture was treated with a solution of 161 g. of ammonium chloride in 300 ml. of water. The ether was evaporated, the residual aqueous mixture heated one hour to complete hydrolysis and the organic material extracted with ether. After acid-base treatment to separate non-basic material, the residual basic material was distilled at 185–190° C. to give 110 g. (31%) of 1-benzyl-3-benzoyl-pyrrolidine.

Preparation IV

Other 1-substituted-3-benzoylpyrrolidines and 1-substituted-3-(ring substituted benzoyl)-pyrrolidines prepared by the same method as above are disclosed below.

3-benzoyl-1-isopropylpyrrolidine is produced from 3-cyano-1-isopropylpyrrolidine and phenylmagnesium bromide.

1-Benzyl-3-(p-chlorobenzoyl)-pyrrolidine is produced from 1-benzyl-3-cyanopyrrolidine and p-chlorophenylmagnesium bromide.

1-Benzyl-3-(p-trifluoromethylbenzoyl) - pyrrolidine is produced from 1-benzyl-3-cyanopyrrolidine and p-trifluoromethylphenylmagnesium bromide.

1-Phenyl-3-(p-methoxybenzoyl)-pyrrolidine is produced from 3-cyano-1-phenylpyrrolidine and p-methoxyphenylmagnesium bromide.

1 - Cyclohexyl-3-(p - dimethylaminobenzoyl) - pyrrolidine is produced from 1-cyclohexyl-3-cyanopyrrolidine and p-dimethylaminophenylmagnesium bromide.

1-(p-Tolyl) - 3 - (o - methylbenzoyl)-pyrrolidine is produced from 3-cyano-1-(p-tolyl)-pyrrolidine and p-methylphenylmagnesium bromide.

1-(2-Phenoxyethyl) - 3 - benzoylpyrrolidine is produced from 3-cyano-1-(2-phenoxyethyl)-pyrrolidine and phenylmagnesium bromide.

1-[2-(N-Benzyl) - phenylaminoethyl]-3-benzoylpyrrolidine is produced from 3-cyano-1-[2-(N-benzyl)-phenylaminoethyl]-pyrrolidine and phenylmagnesium bromide.

1-[2-(o-Tolyl)-ethyl]-3-benzoylpyrrolidine is produced from 3-cyano-1-[2-(o-tolyl)-ethyl]-pyrrolidine and phenyl-magnesium bromide.

Preparation V: 1-ethyl-α-ethyl-α-phenyl-3-pyrrolidinemethanol

In a 500 ml. three necked flask equipped with a stirrer, dropping funnel and efficient reflux condenser protected by a drying tube, were placed 6.1 g. (0.25 g. atom) of magnesium turnings, 50 ml. of dry ether and a crystal of iodine. After several milliliters of a solution of 39.0 g. (0.25 mole) of ethyl iodide in 50 ml. of dry ether was added, the reaction started and the remainder of the solution was added at a rate which maintained vigorous refluxing. After the addition was complete, stirring and refluxing were continued for one hour. To the stirred Grignard solution was added 30.4 g. (0.15 mole) of 3-benzoyl-1-ethylpyrrolidine in 50 ml. of dry ether at a rate which maintained gentle refluxing. Stirring and refluxing were continued for one hour. The cooled mixture was decomposed by the slow addition of a solution of 13.4 g. of ammonium chloride in 150 g. of water. The ether layer was decanted into a separatory funnel and the pastey residue was extracted with three 100 ml. portions of ether. The combined ether extracts were washed with 10% sodium carbonate solution and then with water. After drying over sodium sulfate, the ether was distilled and the residue fractionated through a 10 cm. Vigreux column at .01 mm. The pale, yellow non-viscous oil boiled at 94–96° and weighed 18 g. (51% yield), $n^{24}$ 1.5254.

Analysis.—Calculated for $C_{15}H_{23}NO$: C, 77.20; H, 9.93; N, 6.00. Found: C, 77.23; H, 9.99; N, 6.12.

Preparation VI: Other 1-substituted-α,α-disubstituted-3-pyrrolidinemethanols

In the manner of Preparation V, the following compounds are prepared:

1-Phenyl-α-ethyl-α-(p - methoxyphenyl)-3-pyrrolidinemethanol from 1-phenyl-3-(p-methoxybenzoyl) - pyrrolidine and ethylmagnesium iodide.

1-Cyclohexyl-α-ethyl - α - (p-dimethylaminophenyl)-3- pyrrolidinemethanol from 1-cyclohexyl - 3 - (p-dimethyl-aminobenzoyl)-pyrrolidine and ethylmagnesium iodide.

1-(p-Tolyl)-α-ethyl-α-(o - tolyl)-3-pyrrolidinemethanol from 1-(p-tolyl) - 3 - (o - methylbenzoyl)-pyrrolidine and ethylmagnesium iodide.

1-(2-Phenoxyethyl)-α-ethyl-α-phenyl - 3 - pyrrolidinemethanol from 1-(2 - phenoxyethyl)-3-benzoylpyrrolidine and ethylmagnesium iodide.

1 - [2 - (N - Benzyl) - phenylaminoethyl]-α-methyl-α-phenyl - 1,3 - pyrrolidinemethanol from 1-[2-(N-benzyl)-phenylaminoethyl]-3-benzoylpyrrolidine and methylmagnesium iodide.

1-[2-(o - Tolyl)-ethyl]-α-ethyl-α-phenyl-3-pyrrolidinemethanol from 1-[2-(o-tolyl)-ethyl]-3-benzoylpyrrolidine and ethylmagnesium iodide.

Preparation VII: 1-ethyl-α-phenyl-3-pyrrolidinemethanol

In a one liter three necked flask equipped with a stirrer, dropping funnel and efficient reflux condenser protected by a drying tube, were placed 18.9 g. (0.50 mole) of lithium aluminum hydride and 400 ml. of dry ether. The suspension was stirred and a solution of 50.8 g. (0.25 mole) of 1-ethyl-3-benzoylpyrrolidine in 200 ml. of dry ether was added slowly at a rate which maintained gentle refluxing. After the addition was complete, 80 g. of ethyl acetate was added at a rate which maintained vigorous refluxing to decompose the excess amount of reducing agent. The mixture was then cooled and 36 ml. of water was added slowly. The precipitated alumina was dissolved by the addition of 300 ml. of 25% sodium hydroxide solution. The ether layer was separated and the aqueous layer was extracted several times with ether. The combined ether extracts were washed with water and the solvent was evaporated. The residue was distilled at reduced pressure and the fraction boiling at 108–109°/.005 mm. was collected. The water-white, viscous oil weighed 40.1 g. (78% yield), $n^{24}$ 1.5390.

Analysis.—Calculated for $C_{13}H_{19}NO$: C, 76.05; H, 9.33; N, 6.82. Found: C, 76.07; H, 9.33; N, 6.78.

Preparation VIII: α-Methyl-α-phenyl-3-pyrrolidinemethanol

A solution of 129 g. (0.46 mole) of 1-benzyl-α-methyl-α-phenyl-3-pyrrolidinemethanol in 150 ml. of 95% ethanol was placed in the reaction bottle of the catalytic reduction apparatus and 6 g. of 10% palladium-on-charcoal catalyst was added. The mixture was heated at 70° C. and shaken with hydrogen until an equivalent of hydrogen was absorbed (about two hours). After cooling, the suspension was filtered, and the solvent evaporated. The residue was distilled at reduced pressure and the fraction boiling at 111–113°/.02 mm. collected. The water-white, viscous oil which solidified on cooling (M.P. 80–100°) weighed 52 g. (59% yield).

Analysis.—Calculated for $C_{12}H_{17}NO$: C, 75.35; H, 8.96; N, 7.32. Found: C, 75.18; H, 9.06; N, 7.37.

Preparation IX: 1-(2-Phenylethyl)-2-oxo-α,-α-diphenyl-3-pyrrolidinemethanol

A liquid ammonia solution containing 0.293 mole of lithium amide was prepared by reacting 2.03 g. (0.293 mole) of lithium metal with one liter of liquid ammonia using a catalytic amount of ferric chloride. 1-(2-Phenylethyl)-2-pyrrolidinone (37.0 g.; 0.195 mole) was added slowly and the mixture stirred one hour following addition. An ether solution of 35.5 g. (0.195 mole) of benzophenone was added carefully and the resulting mixture was stirred one hour. The reaction mixture was treated with 16.04 g. (0.30 mole) of ammonium chloride with ether being added to replace the ammonia which evaporated. Evaporation of the ether solution gave a 83.2% yield of product. The oily product was crystallized from isopropyl ether-isooctane to give white crystals melting at 110–111° C. Analysis: Calculated for $C_{25}H_{25}NO_2$: C, 80.83; H,6.78; N,3.77. Found: C,80.54; H,6.78; N,3.86

Preparation X: 1-(2-Phenylethyl)-α,α-diphenyl-3-pyrrolidinemethanol

A solution of 50 g. (0.135 mole) of 1-(2-phenylethyl)-2-oxo-α,α-diphenyl-3 - pyrrolidinemethanol in anhydrous tetrahydrofuran was added dropwise to a stirred gently refluxing suspension of 5.7 g. (0.15 mole) of lithium aluminum hydride in anhydrous tetrahydrofuran. The reaction mixture was decomposed with water after a one hour reaction period. Sodium hydroxide solution (50%) was added to dissolve the alumina. The mixture was filtered through Celite and the filtrate concentrated to an oil which crystallized on cooling. The crude yield was 42.4 g. (87.9%). Recrystallization of the solid from isopropyl ether gave material melting at 118–119° C. Analysis: Calculated for $C_{25}H_{27}NO$: C,83.99; H,7.61; N,3.92. Found: C,83.46; H,7.66; N,3.88.

The physical constants of other 1-substituted-α,α-disubstituted-3-pyrrolidinemethanols prepared as in Preparations V–X are shown in Table I.

Table I

Representative 1-Substituted-α,α-disubstituted-3-pyrrolidinemethanols

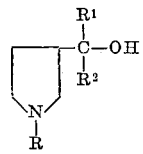

TABLE 1

| R | R¹ | R² | B.P./mm. (M.P.) ° C. | Analysis | | | | | |
|---|---|---|---|---|---|---|---|---|---|
| | | | | C | | H | | N | |
| | | | | Calcd. | Found | Calcd. | Found | Calcd. | Found |
| $C_6H_5CH_2$ | $C_6H_5$ | $C_6H_5$ | (110–111) | 83.93 | 83.82 | 7.34 | 7.41 | 4.08 | 4.09 |
| $C_2H_5$ | $C_6H_5$ | $C_6H_5$ | (81–82) | 81.10 | 81.05 | 8.24 | 8.25 | 4.98 | 4.79 |
| $C_2H_5$ | $C_6H_5CH_2$ | $C_6H_5$ | 147–9/.01 | 81.31 | 81.21 | 8.53 | 8.53 | 4.74 | 4.83 |
| H | $C_6H_5$ | $C_6H_5$ | (156–157) | 80.59 | 80.58 | 7.56 | 7.56 | 5.53 | 5.62 |
| $CH_3$ | $C_6H_{11}$ | $C_6H_5$ | 132+134/.01 | 79.07 | 78.94 | 9.96 | 9.76 | 5.12 | 5.26 |
| $CH_3$ | H | $C_6H_5$ | (70–78) | 75.35 | 75.30 | 8.96 | 8.83 | 7.32 | 7.61 |
| $CH_3$ | $C_6H_5$ | $C_6H_5$ | (66–67.5) | 80.86 | 80.88 | 7.94 | 7.86 | 5.24 | 5.41 |
| $CH_3$ | $CH_3$ | $C_6H_5$ | (79–81) | 76.05 | 75.64 | 9.33 | 9.32 | 6.82 | 6.40 |
| $i-C_3H_7$ | $C_2H_5$ | $C_6H_5$ | 91–93/.03 | 77.68 | 77.72 | 10.19 | 10.24 | 5.66 | 5.81 |
| $C_6H_5CH_2$ | $C_2H_5$ | $C_6H_5$ | 147–148/.01 | 81.31 | 81.16 | 8.53 | 8.36 | 4.74 | 4.81 |
| $C_6H_5CH_2$ | $CH_3$ | $p=ClC_6H_4$ | 160–162/.01 | 72.25 | 72.57 | 7.02 | 7.04 | 4.44 | 4.39 |
| H | $CH_3$ | $p=CF_3C_6H_4$ | (90–96) | 60.22 | 60.11 | 6.22 | 6.40 | 5.40 | 5.44 |
| $C_6H_5CH_2$ | $CH_3$ | $p=CF_3C_6H_4$ | 145–147/.005 | 68.75 | 68.86 | 6.35 | 6.56 | 4.01 | 3.90 |
| $C_2H_5$ | $p=(CH_3O)=C_6H_4$ | $p=(CH_3O)=C_6H_4$ | 997–98) | 73.87 | 74.05 | 7.97 | 8.01 | 4.10 | 4.05 |

The examples below illustrate in detail some of the compounds which comprise this invention and methods for their production. However, this invention is not to be construed as limited thereby in spirit or in scope. It will be apparent to one skilled in the art that numerous modifications in materials and methods can be adopted without departing from the invention.

Example 1

1 - Ethyl-$\alpha,\alpha$ - diphenyl - 3 - pyrrolidinemethanol propionate hydrochloride To a solution of 12.82 g. (0.05 mole) of 1-ethyl-$\alpha,\alpha$-diphenyl-3-pyrrolidinemethanol in 150 ml. of dry benzene was added 6.51 g. (0.05 mole) of propionic anhydride dropwise with stirring at room temperature. Stirred overnight at room temperature, then at 70° for 16 hours. The benzene was removed on a rotary steam evaporator at reduced pressure, then transferred to high vacuum to remove any unreacted anhydride. The remaining viscous oil was converted to the hydrochloride salt with ethereal HCl and recrystallized from ethyl ether and acetone, yielding white crystals; M.P. 168–169° C. Analysis: Calculated for $C_{22}H_{28}ClNO_2$: C,70.67; H,7.55; N,3.75; Cl, 9.48. Found: C,70.34; H,7.66; N,3.67; Cl,9.51.

Example 2

1 - Methyl - $\alpha$ - ethyl - $\alpha$ - phenyl - 3 - pyrrolidinemethanol propionate furmarate 1 - Methyl - $\alpha$ - ethyl - $\alpha$ - phenyl - 3 - pyrrolidinemethanol propionate was prepared as in Example 1 in 86% yield. The colorless ester distilled at 102–105° C./0.04 mm. A portion (5.5 g.; 0.02 mole) of the free base was added to a warm solution of fumaric acid (2.3 g.; 0.02 mole) in 40 ml. of isopropanol. After several minutes the warm solution was filtered and 100 ml. of isopropyl ether added to the clear filtrate. The colorless fumarate salt which separated weighed 6.0 g. (77% yield) after drying and melted at 112–114° C. Analysis: Calculated for $C_{21}H_{29}NO_6$: C,64.43; H,7.47; N,3.58. Found: C,64.10; H,7.22; N,3.53.

Example 3.—1-ethyl-$\alpha$-benzyl-$\alpha$-phenyl-3-pyrrolidinemethanol propionate fumarate 1 - ethyl - $\alpha$ - benzyl - $\alpha$ - phenyl - 3 - pyrrolidinemethanol propionate was prepared in 94% yield by following the procedure described in Example 1. The fumarate salt was prepared by adding 11.0 g. (0.031 mole) of the free base to a warm solution of 3.6 g. (0.031 mole) of fumaric acid in 70 ml. of isopropanol, filtering the solution and adding 200 ml. of isopropyl ether to the clear filtrate. The crude fumarate salt weighed 10.7 g. (73% yield) and melted at 139–142° C. The salt after recrystallization from isopropanol-isopropyl ether melted at 144–145.5° C.

*Analysis.*—Calculated for $C_{27}H_{33}NO_6$: C, 69.36; H, 7.11; N, 3.00. Found: C, 69.65; H, 7.22; N, 2.98.

Example 4.—1-methyl-$\alpha$-ethyl-$\alpha$-phenyl-3-pyrrolidinemethanol acetate fumarate The methyl ester was prepared as in Example 1 from the precursor 1 - methyl - $\alpha$ - ethyl-$\alpha$-phenyl-3-pyrrolidinemethanole. The fumarate salt was prepared and recrystallized from 2-butanone-methanol to yield a colorless solid melting at 169–172.5° C. The overall yield based on the starting alcohol was 69.3%. A neutral equivalent of 3.69 was found. The theoretical neutral equivalent is 3.77.

Example 5.—1-methyl-$\alpha$-ethyl-$\alpha$-phenyl-3-pyrrolidinemethanol butyrate In the same manner as given in Example 1, this compound is prepared by the reaction of 1-methyl-$\alpha$-methyl-$\alpha$-phenyl-3-pyrrolidinemethanol and butyric anhydride.

Example 6.—1-phenyl-$\alpha$-ethyl-$\alpha$-(p-methoxyphenyl)-3-pyrrolidinemethanol propionate In the same manner as given in Example 1, this compound is prepared by the reaction of 1-phenyl-$\alpha$-ethyl-$\alpha$-(p-methoxyphenyl)-3-pyrrolidinemethanol and propionic anhydride.

Example 7.—1-cyclohexyl-$\alpha$-(p-dimethylaminophenyl)-$\alpha$-ethyl-3-pyrrolidinemethanol propionate In the same manner as given in Example 1, this compound is prepared by the reaction of 1-cyclohexyl-$\alpha$-(p-dimethylaminophenyl)-$\alpha$-ethyl-3-pyrrolidinemethanol and propionic anhydride.

Example 8.—1-(p-tolyl)-$\alpha$-(o-tolyl)-$\alpha$-ethyl-3-pyrrolidinemethanol acetate In the same manner as given in Example 1, this compound is prepared by the reaction of 1-(p-tolyl)-$\alpha$-(o-tolyl)-$\alpha$-ethyl-3-pyrrolidinemethanol and acetic anhydride.

Example 9.—1-(2-phenoxyethyl)-$\alpha$-ethyl-$\alpha$-phenyl-3-pyrrolidinemethanol acetate In the same manner as given in Example 1, this compound is prepared by the reaction of 1-(2-phenoxyethyl)-$\alpha$-ethyl-$\alpha$-phenyl-3-pyrrolidinemethanol and acetic anhydride.

Example 10.—1-(2-phenylaminoethyl)-$\alpha$-methyl-$\alpha$-phenyl-3-pyrrolidinemethanol acetate 1-[2 - N-benzyl)phenylaminoethyl]-$\alpha$-methyl-$\alpha$-phenyl-3-pyrrolidinemethanol is reacted with acetic anhydride to give 1 - [2 - (N - benzyl)phenylaminoethyl]-$\alpha$-methyl-3-$\alpha$-phenyl-3-pyrrolidinemethanol acetate. Catalytic debenzylation of the latter compound using Pd/C catalyst gives 1-(2 - phenylaminoethyl) - $\alpha$ - methyl-$\alpha$-phenyl-3-pyrrolidinemethanol acetate.

Example 11.—1-benzyl-$\alpha$-methyl-$\alpha$-(p-chlorophenyl)-3-pyrrolidinemethanol acetate In the same manner as in Example 1, this compound is prepared by the reaction of 1-benzyl-$\alpha$-methyl-$\alpha$-(p-chlorophenyl)-3-pyrrolidinemethanol and acetic anhydride.

Example 12.—1-benzyl-$\alpha$-methyl-$\alpha$-(p-trifluoromethylphenyl)-3-pyrrolidinemethanol acetate In the same manner as in Example 1, this compound is prepared by the reaction of 1-benzyl-$\alpha$-methyl-$\alpha$-(p-trifluoromethylphenyl)-3-pyrrolidinemethanol and acetic anhydride.

Example 13.—1-[2-(o-tolyl)ethyl]-$\alpha$-ethyl-$\alpha$-phenyl-3-pyrrolidinemethanol acetate In the same manner as in Example 1, this compound is prepared by the reaction of 1-[2-(o-tolyl)ethyl]-$\alpha$-ethyl-$\alpha$-phenyl-3-pyrrolidinemethanol and acetic anhydride.

Examples 14–22 are prepared as in Example 1. The physical constant of Examples 14–22 are shown in Table 2.

Esters of 1-substituted-$\alpha,\alpha$-disubstituted-3-pyrrolidinemethanols

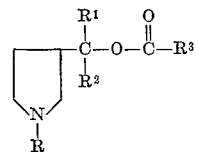

TABLE II

| R | $R^1$ | $R^2$ | $R^3$ | B.P. mm.° C. (M.P.) | Analysis | | | | | |
|---|---|---|---|---|---|---|---|---|---|---|
| | | | | | C | | H | | N | |
| | | | | | Calcd. | Found | Calcd. | Found | Calcd. | Found |
| $C_2H_5$ | $C_2H_5$ | $C_6H_5$ | $C_2H_5$ | 122–124/.01 | 74.70 | 75.08 | 9.40 | 9.60 | 4.84 | 4.95 |
| $C_2H_5$ | H | $C_6H_5$ | $C_2H_5$ | 107–108/.005 | 73.53 | 73.45 | 8.87 | 8.87 | 5.36 | 5.41 |
| $C_6H_5CH_2$ | H | $C_6H_5$ | $C_2H_5$ | 155–160/.05 | 77.98 | 77.64 | 7.99 | 7.75 | 4.33 | 4.61 |
| $CH_3$ | $CH_3$ | $C_6H_5$ | $C_2H_5$ | 90–92/.02 | 73.53 | 73.73 | 8.87 | 8.83 | 5.36 | 5.22 |
| $CH_3$ | $C_2H_5$ | $C_6H_5$ | $C_2H_5$ | 95–96/.02 | 74.14 | 72.25 | 9.15 | 9.22 | 5.09 | 5.08 |
| i=$C_3H_7$ | H | $C_6H_5$ | $C_2H_5$ | 96–98/.02 | 76.66 | 76.65 | 9.65 | 9.50 | 6.39 | 6.56 |
| i-$C_3H_7$ | $C_2H_5$ | $C_6H_5$ | $C_2H_5$ | 107–109/.005 | 75.20 | 75.28 | 9.63 | 9.51 | 4.62 | 4.70 |
| $C_2H_5$ | $C_2H_5$ | $C_6H_5$ | $C_2H_5$ | 89–92/.001 | 74.70 | 74.97 | 9.40 | 9.41 | 4.84 | 5.08 |
| $CH_3$* | $C_2H_5$ | $C_6H_5$ | $CH_3$ | (168.5–172) | 63.65 | 63.83 | 7.21 | 7.21 | 3.71 | 3.33 |

*The melting point and analysis are for the fumarate salt.

Pharmacology

The high order of activity of the active agents of the present invention, as evidenced by tests in lower animals (representative of which are reported herein) is indicative of utility in human beings as well. It will be clearly understood that the distribution and marketing of any compound or composition falling within the scope of the present invention for use in human beings will of course have to be predicated upon prior approval by governmental agencies, such as the Federal Food and Drug Administration, which are responsible for and authorized to pass judgement on such questions.

*Formulation and administration*: Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The free basic amino compounds, while effective, are preferably formulated and administered in the form of their non-toxic acid-addition or quaternary ammonium salts for purposes of convenience of crystallization, increased solubility, and the like.

Although very small quantities of the active materials of the present invention, even as low as 0.1 milligrams, are effective when minor therapy is involved or in cases of administration to subjects having a relatively low body weight, unit dosages are usually five milligrams or above and preferably twenty-five, fifty or one-hundred milligrams. Five to fifty milligrams appears optimum per unit dose, while usual broader ranges appear to be one to 500 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian. Results upon administration of these novel materials have thus far proved extremely gratifying.

Examples of composition within the preferred ranges given are as follows:

CAPSULES

Ingredients: Per Cap., mg.
1. Active ingredient, as salt _____ 25.000
2. Lactose _____ 146.000
3. Magnesium stearate _____ 4.000

Procedure:
1. Blend 1, 2 and 3.
2. Mill this blend and blend again.
3. This milled blend is then filled into #1 hard gelatin capsules.

TABLETS

Ingredients: Mg./tab.
1. Active ingredient, as salt _____ 25.0
2. Corn starch _____ 20.0
3. Alginic acid _____ 20.0
4. Sodium alginate _____ 20.0
5. Magnesium stearate _____ 1.3

Procedure:
1. Blend 1, 2, 3 and 4.
2. Add sufficient water portionwise to the blend from step #1 with careful stirring after each addition. Such additions of water and stirring continue until the mass is of a consistency to permit its conversion to wet granules.
3. The wet mass is converted to granules by passing it through the oscillating granulator, using 8-mesh screen.
4. The wet granules are then dried in an oven at 140° F.
5. The dried granules are then passed through an oscillating granulator, using a 10-mesh screen.
6. Lubricate the dry granules with 0.5% magnesium stearate.
7. The lubricated granules are compressed on a suitable tablet press.

INTRAMUSCULAR INJECTION

Ingredients: Mg. per ml.
1. Active ingredient, as salt _____ 25.0
2. Isotonic buffer solution (q.s. to 2.0 ml.) _____ 4.0

Procedure:
1. Dissolve the active ingredient in the buffer solution.
2. Aseptically filter the solution from step #1.
3. The sterile solution is now aseptically filled into sterile ampoules.
4. The ampoules are sealed under aseptic conditions.

We claim:
1. A compound selected from the group consisting of lower alkyl esters of 3-pyrrolidinemethanols having the formula:

$$\begin{array}{c} R^1 \quad O \\ | \quad \| \\ -C-C-R^3 \\ | \\ R^2 \end{array}$$

(pyrrolidine ring with N-R substituent)

wherein:
R is selected from the group consisting of lower alkyl of one to eight carbon atoms, phenyllower-alkyl, phenoxylower-alkyl, phenylamino-lower-alkyl, phenyl and X-phenyl, $R^1$ is selected from the group consisting of hydrogen, lower-alkyl of one to eight carbon atoms, phenyl-lower-alkyl, phenyl and X-phenyl, $R^2$ is selected from the group consisting of phenyl and X-phenyl, $R^3$ is lower alkyl of one to eight carbon atoms inclusive, and wherein X is selected from the group consisting of from 1 to 3 of the following radicals: lower-alkoxy, lower alkyl, di-lower-alkyl amino, trifluoromethyl, halogen and acid addition salts thereof.

2. A compound of claim 1 which is a lower alkyl ester having one to eight carbon atoms of 1-ethyl-α,α-diphenyl-3-pyrrolidinemethanol.

3. A compound of claim 1 which is a lower alkyl ester having one to eight carbon atoms of 1-ethyl-α-ethyl-α-phenyl-3-pyrrolidinemethanol.

4. A compound of claim 1 which is a pharmaceutically acceptable acid addition salt of a lower alkyl ester of 1-lower alkyl-α-lower alkyl-α-phenyl-3-pyrrolidinemethanol wherein lower alkyl has 1–8 carbon atoms.

5. A compound of claim 1 which is a pharmaceutically acceptable acid addition salt of a lower alkyl ester of 1-lower alkyl-α-lower alkyl-α-substituted phenyl-3-pyrrolidinemethanol wherein lower alkyl has 1–8 carbon atoms.

6. A compound of claim 1 which is a lower alkyl ester of 1-lower alkyl-α-lower alkyl-α-phenyl-3-pyrrolidinemethanol where in lower alkyl has 1–8 carbon atoms.

7. A compound of claim 1 which is a lower alkyl ester of 1-lower alkyl-α-lower alkyl-α-substituted phenyl-3-pyrrolidinemethanol wherein lower alkyl has 1–8 carbon atoms.

8. A compound of claim 1 which is 1-ethyl-α-ethyl-α-phenyl-3-pyrrolidinemethanol propionate.

9. A compound of claim 1 which is 1-ethyl-α-phenyl-3-pyrrolidinemethanol propionate.

10. A compound of claim 1 which is 1-benzyl-α-phenyl-3-pyrrolidinemethanol propionate.

11. A compound of claim 1 which is 1-methyl-α-methyl-α-phenyl-3-pyrrolidinemethanol propionate.

12. A compound of claim 1 which is 1-methyl-α-ethyl-α-phenyl-3-pyrrolidinemethanol propionate fumarate.

13. A compound of claim 1 which is 1-ethyl-α,α-diphenyl-3-pyrrolidinemethanol propionate hydrochloride.

14. A compound of claim 1 which is 1-isopropyl-α-ethyl-α-phenyl-3-pyrrolidinemethanol propionate.

15. A compound of claim 1 which is 1-ethyl-α-ethyl-α-phenyl-3-pyrrolidinemethanol acetate.

16. A compound of claim 1 which is 1-methyl-α-ethyl-α-phenyl-3-pyrrolidinemethanol propionate fumarate.

17. A compound of claim 1 which is 1-ethyl-α-benzyl-α-phenyl-3-pyrrolidinemethanol propionate fumarate.

18. A compound of claim 1 which is 1-methyl-α-ethyl-α-phenyl acetate fumarate.

References Cited

Doyle et al.: Chemical Abstracts, vol. 56, pp. 1425–26 (1962).

ALEX MAZEL, Primary Examiner

JOSE TOVAR, Assistant Examiner

U.S. Cl. X.R.

260—326.5; 424—274